United States Patent
Hirs et al.

[15] 3,695,433
[45] *Oct. 3, 1972

[54] METHOD OF FILTERING A MIXTURE OF LIQUID AND FIBROUS SOLID CONTAMINANTS

[72] Inventors: Gene Hirs, Birmingham; Richard H. Wykoff, Livonia, both of Mich.

[73] Assignee: Hydromation Filter Company, Livonia, Mich.

[*] Notice: The portion of the term of this patent subsequent to Dec. 29, 1987, has been disclaimed.

[22] Filed: Sept. 28, 1970

[21] Appl. No.: 76,654

[52] U.S. Cl. ...................210/67, 210/80, 210/275
[51] Int. Cl. ..............................................B01d 29/38
[58] Field of Search..........210/67, 80, 274, 275, 276, 210/279, 82

[56] References Cited

UNITED STATES PATENTS

| | | | |
|---|---|---|---|
| 3,016,147 | 1/1962 | Cobb et al. | 210/275 |
| 3,550,774 | 12/1970 | Hirs et al. | 210/80 X |

*Primary Examiner*—Samih N. Zaharna
*Attorney*—Cullen, Settle, Sloman & Cantor

[57] ABSTRACT

This invention presents a filter and a method of filtration which is specifically adapted for the filtration of solid fibrous contaminants from a liquid, the contaminants having a low breadth-to-length ratio. The filtration of such fibers has long posed a problem due to the tendency of such fibers to surface load existing filter media.

One aspect of the invention resides in the utilization of a relatively large granular media, i.e., an organic polymeric granular media in which the granules are essentially spherical and of an average size ranging from about 0.050 inch to 0.375 inch. It has been found that the interstices of such relatively large media granules will effectively remove fibrous materials while, at the same time, the granules are so large as to resist appreciable surface loading.

Another aspect of the invention resides in the "backwash" procedures for removing accreted fiber contaminants from the granular filter bed. This procedure involves forming the organic polymeric granules into a slurry in the liquid being filtered, while violently agitating the slurry to wash entwined and matted fibers contaminants from the individual granules and separating the fibrous contaminants from the slurry together with a portion of the liquid being filtered.

1 Claim, 3 Drawing Figures

INVENTORS
GENE HIRS.
RICHARD H. WYKOFF
BY:
CULLEN, SETTLE, SLOMAN & CANTOR.
ATT'YS.

INVENTORS
GENE HIRS.
BY: RICHARD H. WYKOFF
CULLEN, SETTLE, SLOMAN & CANTOR
ATT'YS.

3,695,433

METHOD OF FILTERING A MIXTURE OF LIQUID AND FIBROUS SOLID CONTAMINANTS

BACKGROUND OF THE INVENTION

The filtration of fibrous or lint-like solid contaminants from liquids has always been difficult and inefficient. For instance, in the pulp and paper industry great quantities of valuable pulp are lost in waste water because no confentional method of filtering or straining provides a practical means for recovery of the waste pulp which is a fibrous material.

When a liquid contains appreciable quantities of fibrous contaminants, conventional strainers are rapidly clogged and ordinary cloth or paper filters surface load in a short time. Deep bed filters, which conventionally use filter media of a size less than 0.050 inch, also will surface load very quickly, and require an impractical frequency of backwashes.

It is, thus, an object of the present invention to provide a practical method for removing fibrous or lint-like contaminants from a liquid.

DESCRIPTION OF THE INVENTION

To function effectively, a filter for removing fibrous contaminants must have the capacity to prevent rapid surface loading. Rapid surface loading does not occur in the present invention because, under normal operation, the fibrous contaminants penetrate the surface of the filter and become entrapped throughout the filter media, much in the same manner that spherical or irregularly shaped contaminants are entrapped in a conventional deep bed filter.

The present invention consists, in part, of a body of granular, organic polymeric filter media, with granules much larger than ordinary deep bed filter media, having an average minimum cross-sectional dimension of from 0.050 to 0.375 inch. The size of filter media used in a particular application depends on the concentration and size of fibrous contaminants.

As the fibrous contaminants become entrapped in the body of filter media, they tend to wrap tightly about the individual granules of filter media. Testing has shown that a simple backwashing of such a filter will not detach the tightly wrapped contaminants from the filter media. What is required, and what is an important part of the present invention, is a violent agitation or washing of the filter media to cause the fibrous contaminants to detach from the individual granules of filter media. This detachment is best accomplished by slurrying the body of filter media and flowing it externally from the filter tank with sufficient velocity and turbulence to detach the fibrous contaminants from the granules of filter media.

The degree of violent or turbulent flow is not fixed for all cases, but varies depending upon size of filter media, size of fibrous contaminants, concentration of contaminants, and amounts and types of non-fibrous contaminants. The variables are so numerous and interrelated that the optimum turbulent flow becomes by necessity an empirically determinable figure.

After detachment of the fibers, the mixture of fibers and filter media can be separated by conventional means such as settling and decanting or can be separated by flowing the mixture of contaminant, media and liquid past a perforate screen through which the contaminants are withdrawn with a portion of the liquid.

IN THE DRAWINGS

AS SHOWN IN THE DRAWINGS

Figure 1:
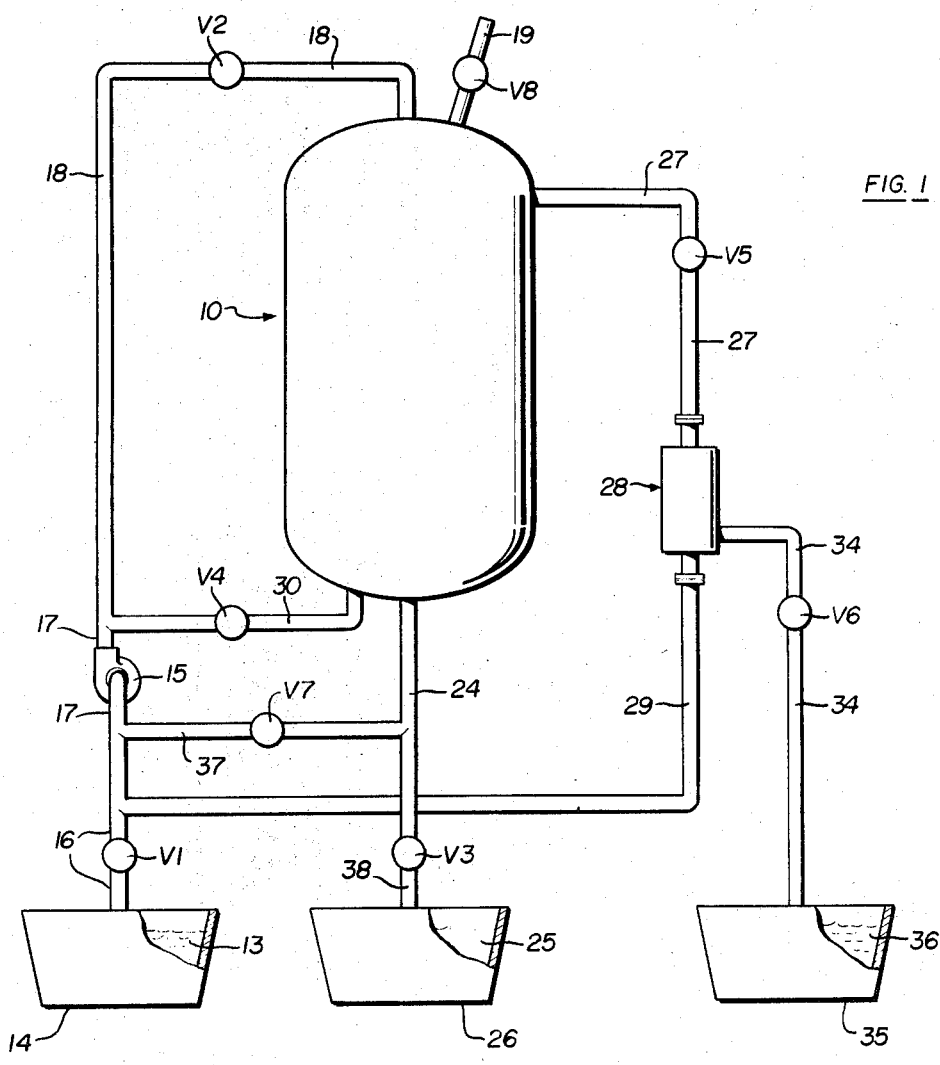
FIG. 1 is a schematic representation of an elevation view of one configuration of the present invention.
Figure 2:
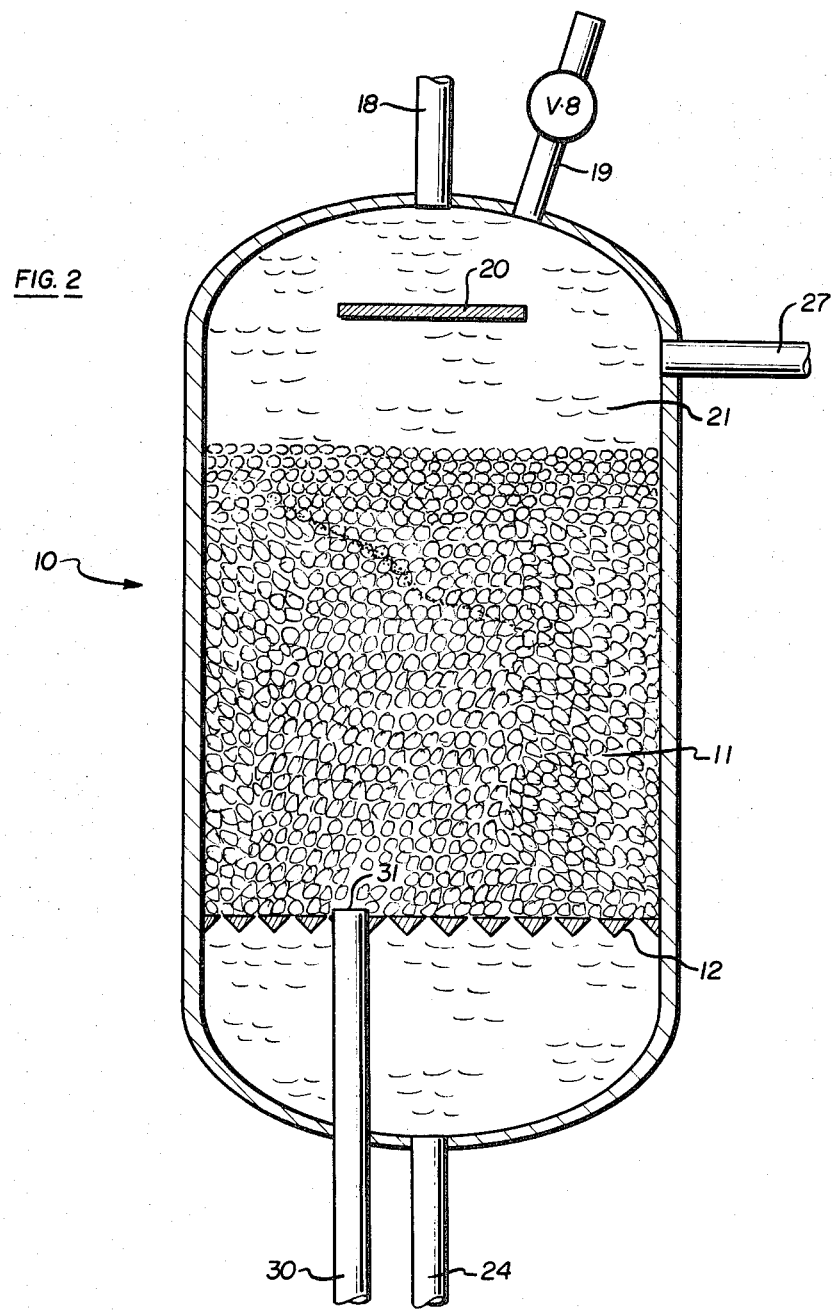
FIG. 2 is a cross-sectional view along plane 2—2 of FIG. 1.

As shown in FIGS. 1 and 2, numeric designation 10 represents a tank which is partially filled with filter media 11 supported by outlet septum 12. The outlet septum 12 in the preferred embodiment is a standard, stainless steel wedge wire screen with openings sufficiently wide to permit the passage of contaminant particles but narrow enough to retain the filter media 11.

The dirty liquid 13 to be filtered contains particulate contaminants, at least a part of which are fibrous or lint-like in nature, such as paper pulp found in white water wastes of paper mills or hair found in tanning waste water.

Filter media 11 can be any granular, organic polymeric material in the size range of 0.050 inch to 0.375 inch. Typical materials which can be utilized include polyvinyl chloride, polypropylene and polyethylene materials which are granular and free-flowing and which are essentially spherical in configuration. Essentially spherical materials include pock-marked ellipsoidal materials, tear-drop shaped materials or other shapes which will not interlock or interdigitate to prevent flowing or slurrying. Testing has shown filter media smaller than 0.050 inch creates a condition of rapid surface loading requiring backwashing at too frequent a rate, and that filter media larger than 0.375 inch allowed too great a quantity of contaminants to break through the filter. It is within the 0.050 to 0.375 inch range for filter media size that fibrous contaminants penetrate the surface and are effectively entrapped in the body of filter media.

In an experimental pilot operation in a fine paper manufacturing plant, a filter having a configuration similar to that described herein with polyethylene filter media of about 0.160 inch in size was filtering paper pulp waste water having a suspended solids concentration of 300 ppm or greater. With a flow rate of 50 GPM per square foot of filter media inlet area, the effluent clarity was 30 ppm suspended solids and consisted mostly of non-pulp clay fines. The filter was backwashed when the amount of pulp entrapped in the filter medium exceeded 1.75 pounds of pulp per cubic foot of filter media. At this flow rate and filter loading, there was no "blind-off" surface loading of the filter medium between backwash cycles which were at 1-hour intervals.

To withstand the vigorous action of the backwash method of the present invention and to provide favorable handling characteristics, the filter media must be an organic polymer, preferably polyethylene, polypropylene, or polyvinyl chloride. Sand, coke, coal, and other similar filter media materials are much too brittle, abrasive, or heavy to be used with the violent backwashing of the present invention.

Prior to initial filtration, tank 10 is filled with dirty liquid 13 by any suitable means, such as pumping directly from tank 14, with valves V1, V2, and V8 open and all other valves closed. Entrapped air is vented out of air vent 19. This procedure completely fills tank 10 with liquid prior to filtration to ensure uniform filtration flow through the filter bed.

Filtration of dirty liquid 13 is accomplished by starting variable flow pump 15 at its filtration flow rate, opening valves V1, V2, and V3, and closing all other valves. This draws dirty liquid 13 from tank 14 into and through lines 16, 17, and 18, and against splash plate 20. The dirty liquid 13, having passed from line 18 and against splash plate 20, continues through filter media 11 and proceeds as the filtrate or clean liquid 25 through septum 12, into and through lines 24 and 38, and into tank 26.

Testing has shown that the filter flow rate in all cases can be at least 10 gallons per minute per square foot of filter media inlet area. However, the maximum filter flow rate permissible without dirt particle breakthrough is best determined empirically, and varies with desired effluent clarity, average size of contaminants, type and size of filter media, and depth of filter media.

The normal flow of dirty liquid into the filter medium and effluent from the filter medium will continue until such time as sufficient fibrous dirt particles have become entrapped in the body of filter media to substantially inhibit the flow of liquid therethrough or until such time as the effluent in line 24 is of an intolerable degree of turbidity. Either the increase in resistance to flow of liquid through the filter medium or such increased turbidity may be readily measured and used to determine the necessity for cleansing the filter media. Determination of the start of the cleansing cycle by a use of pressure drop across the filter medium can be accomplished by simple pressure gauges installed in lines 18 and 24, which gauges would sound an alarm, give a visual indication, or even automatically initiate the cleansing cycle at a predetermined pressure differential. Alternatively, a continuous turbidity monitoring system may be installed in the clean outlet or effluent line 24, such a monitoring system would again give an audible or visual alarm, or initiate automatically the cleansing cycle.

Upon initiating the cleansing or backwash cycle to remove entrapped fibrous contaminants from the filter medium, all valves are closed, except valves V4 and V5 which are open. Variable flow pump 15 is then started at a flow rate greater than the filter flow rate, causing the filter media to violently circulate as a slurry from tank 10 into and through line 27, draw-off device 28, and lines 29, 17, and 30, back to tank 10.

As was previously mentioned, filter media 11 only partially fills tank 10, leaving space 21 above the filter media. This space 21 allows the body of filter media to expand and fluidize into a slurry during the cleansing or backwash cycle, and preferably is large enough to permit a fifty per cent expansion of the filter bed.

Line 30 is situated with its outlet 31 through septum 12 and in the filter medium 11 because the openings in septum 12 are too narrow for passage of the filter medium 11.

During filtration the fibrous or lint-like contaminants wrap tightly about the individual granules of filter media. The fibers are so firmly bound to the granules of filter media that ordinary backwash and scribbing methods fail to dislodge the fibers from the granules. Testing and research has shown that a violent or very turbulent action of filter media and entrapped contaminant fibers is necessary to separate the fibers from the filter media granules. This is accomplished by a mechanical agitator, but is best accomplished by highly turbulent flow of a slurry of filter media and entrapped fibrous contaminants through pipes external from the filter tank. Though the relative turbulence of the backwash slurry cycle is an empirical figure, testing has shown that at least the equivalent of one-thirtieth of one horsepower of mechanical work per cubic foot of slurry must be expended to accomplish the required detachment.

Figure 3:
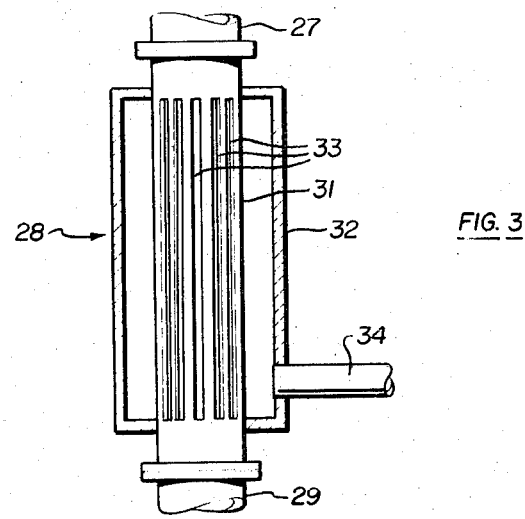
FIG. 3 is a cross-sectional view along plane 3—3 of FIG. 1.

Once the fibrous contaminants have detached from the granules of filter media, the fibers and granules must then be separated. One such method and device for separation is draw-off device 28, shown in detail in FIG. 3. Draw-off device 28, which operates under the same principle as the apparatus disclosed in my copending patent application Ser. No. 808,868, filed March 20, 1969, now U.S. Pat. No. 3,550,774 consists of pipe 32 concentrically placed and sealed about perforate pipe 31, which runs between lines 27 and 29. In the configuration of FIG. 3, the perforations of pipe 31 are slots 33, located within the enclosure of pipe 32, of sufficient width to allow passage of contaminants and not filter media 11. Slots 33 are spaced or arranged in a manner to prevent the fibrous contaminants from wrapping around slots 33 and clogging free flow out of pipe 31 through the perforations. Preferably, the slots 33 are of a width less than the cross-sectional dimensions of the media granules. However, where high velocity flow along the slots 33 occurs, the slots may be larger than the granules without the loss of media.

While the slurry of filter media and contaminants is still circulating, and after the fibers have detached from the granules of filter media, valves V1 and V6 are opened simultaneously. This causes a portion of the liquid and contaminants to flow from the circulating slurry through slots 33 into the space between pipes 31 and 32. This mixture of fibrous contaminants and liquid, designated wash waste liquid 36, then flows into and through line 34 and into tank 35 for later disposal of treatment. Concurrently, because valve V1 is opened, the amount of wash waste liquid 36 lost from the slurry is made up by additional liquid being drawn into the slurry from tank 14 through line 16.

The use of draw-off device 28 does not result in complete removal of contaminants from the filter medium, but accomplishes a dilution wherein a concentrated portion of contaminants is drawn off and replaced with less concentrated dirty liquid. The draw-off continues until such time that the filter medium is sufficiently clean for filtration to begin again.

After the cleansing cycle is completed, the filter medium 11 is returned to tank 10 by closing all valves except valves V2, V5 and V7 and operating pump 15 at its filter flow rate. Filtration is then preceded by a purge cycle, the purpose of which is to remove contaminants from line 24 and the lower portion of the filter bed to prevent breakthrough at filtration startup. During the purge cycle all valves, except valves V2 and V7, are closed and pump 15 is operating at filter flow rate. The dirty liquid contained in tank 10 immediately after backwash is thus circulated through lines 24, 37, 17 and 18 and through filter media until the contaminants are entrapped in the filter medium. Valve V7 is then closed, Valve V2 remains open, and valves V1 and V3 are opened to resume the normal filtration cycle.

The capacity of the filter medium to hold contaminants can be measurably increased by circulating the slurry of filter media and entrapped contaminants and replacing it in the filter tank and continuing with the filtration cycle at frequent intervals between cleansing cycles.

This intermediate slurry cycle serves to distribute fibrous contaminants throughout the body of filter media and enhances its ability to entrap additional fibrous contaminants. The intermediate slurry cycle consists of closing all valves except valves V4 and V5 and running pump 15 at its higher flow rate. A slurry of filter media and contaminants is formed and flows from tank 10 into and through line 27, draw-off device 28, and lines 29, 17 and 30 back to tank 10. After a short time, the filter medium is returned to tank 10 by opening valves V2, V5, and V7, closing all other valves, and operating pump 15 at its filter flow rate. The filter is then purged by closing all valves, except valves V2 and V7 which are open, and operating pump 15 at its filter flow rate. Normal filtration than follows by closing valve V7 and opening valves V1 and V3, valve 2 remaining open.

We claim:

1. In the method of removing fibrous solid contaminants of elongated stringy configuration from a liquid, the steps of:
   1. interposing between an inlet opening and an outlet opening of a filter housing a body of granular organic polymeric filter media of essentially spherical configuration having an average diameter ranging from about 0.050 inch to about 0.375 inch;
   2. flowing a mixture of said fibrous solid contaminants and liquid from said inlet opening through said media to said outlet opening, thereby accreting said fibrous contaminants in said body of media;
   3. periodically cleansing said body of media of accreted fibrous solid contaminants by the steps of:
      a. terminating the flow of said slurry through said inlet opening,
      b. agitating the filter media by creating a backwash flow therethrough in a direction opposite to the filtering flow of step (2) from a backwash inlet to a backwash outlet, said backwash flow creating sufficient turbulence to form a slurry of said filter media and to detach said contaminants from said filter media granules,
      c. flowing said slurry through a separator located within the backwash flow path exterior of said housing thereby separating at least a portion of said contaminants from said slurry, the separator having a separating wall constructed and arranged to permit the fibrous contaminants but not the filter media to pass therethrough, and
      d. reforming said body of filter media by causing said slurry to flow from said separator to said housing and through said housing between said inlet and outlet opening of step (1) prior to re-establishing the filtering flow of step (2).

* * * * *